(12) United States Patent
Kogge

(10) Patent No.: US 10,896,127 B2
(45) Date of Patent: Jan. 19, 2021

(54) HIGHLY CONFIGURABLE MEMORY ARCHITECTURE FOR PARTITIONED GLOBAL ADDRESS SPACE MEMORY SYSTEMS

(71) Applicant: Lucata Corporation, New York, NY (US)

(72) Inventor: Peter M. Kogge, Granger, IN (US)

(73) Assignee: Lucata Corporation, New York, NY (US)

( * ) Notice: Subject to any disclaimer, the term of this patent is extended or adjusted under 35 U.S.C. 154(b) by 25 days.

(21) Appl. No.: 14/160,634

(22) Filed: Jan. 22, 2014

(65) Prior Publication Data

US 2014/0208059 A1   Jul. 24, 2014

Related U.S. Application Data

(60) Provisional application No. 61/755,646, filed on Jan. 23, 2013.

(51) Int. Cl.
*G06F 12/06* (2006.01)

(52) U.S. Cl.
CPC ................................ *G06F 12/0692* (2013.01)

(58) Field of Classification Search
CPC .................................................. G06F 12/0692
See application file for complete search history.

(56) References Cited

U.S. PATENT DOCUMENTS

| 4,365,319 | A | | 12/1982 | Takemae | |
|---|---|---|---|---|---|
| 5,111,389 | A | * | 5/1992 | McAuliffe | G06F 12/0607 711/200 |
| 6,678,801 | B1 | * | 1/2004 | Greim et al. | 711/148 |
| 7,185,150 | B1 | | 2/2007 | Kogge | |
| 2002/0042868 | A1 | * | 4/2002 | Godtland et al. | 711/209 |
| 2004/0044872 | A1 | * | 3/2004 | Scott | 711/202 |
| 2004/0215919 | A1 | * | 10/2004 | Emmes | G06F 12/1009 711/208 |
| 2012/0151178 | A1 | * | 6/2012 | Brownlow et al. | 711/206 |

OTHER PUBLICATIONS

Barriuso et al., "SHMEM User's Guide for C" Cray Research, Inc., Jun. 20, 1994 pp. 1-21.
Alverson et al., "The Tera Computer System" Proceedings if the 4th international conference on Supercomputing (ICS '90) 1990, pp. 1-6.
Anderson et al., "Performance of the CRAY T3E multiprocessor" Proceedings of the 1997 ACM/IEEE Conference Supercomputing (CDROM Supercomputing '97) 1997, pp. 1-17.

(Continued)

*Primary Examiner* — Larry T Mackall
(74) *Attorney, Agent, or Firm* — Gesmer Updegrove LLP

(57) ABSTRACT

A system and method for identifying from an address an appropriate target node and a location in that node that holds desired data related to that address is provided. The system and method includes a logical address generator that generates a logical address. The system and method includes a subspace index extraction module that extracts a subspace index from the logical address. The system and method includes a subspace configuration table that retrieves a plurality of parameters of the subspace index to locate the desired data.

32 Claims, 14 Drawing Sheets

(56) References Cited

OTHER PUBLICATIONS

Bonachea et al., "GASNet Specification, v1.1" University California, Berkley, Tech, Rep., 2002, 37 pages.

Callahan et al., "The Cascade High Productivity Language" High Level Parallel Programming Models and Supportive Environments, 2004, Proceedings, Ninth International Workshop on IEEE, 2004, 9 pages.

Carlson et al., "Introdution to UPC and Language Specification" Center for Computing Sciences, Institute for Defense Analyses 1999, pp. 1-17.

Culler at 1. "Parallel Programing in Split-C" Supercomputing '93; Proceedings IEEE, 1993, 8 pages.

Ebcioglu et al., "X10: Programming for Hierarchical Parallelism and Non-Uniform Data Access" 3rd International Workshop on Language Runtimes, 1994, 11 pages.

Kuchera et al., "The UPC Memory Model: Problems and Prospects" 2004; http://www.gwu.edu/~upc/downloads/UPCmm-IPDPS04-dist.pdf; 9 pages.

Kuck et al., "The Burroughs Scientific Processor (BSP)" IEEE Trans. Compit. 31, 5, May 1982, pp. 90-103.

MPI Forum, "MPI: A Message Passing Interface" 1993, 6 pages.

Nieplocha et al., "ARMCI: A Portable Remote Memory Copy Library for Distributed Array Libraries and Complier Run-Time Systems" Lecture Notes in Computer Science, 1999, Springer-Verlag, pp. 553-546.

Kilburn et al., "One-Level Storage System" IRE Trans. Electronic Computers, 1962, pp. 405-417.

Valero et al., "Conflict-Free Access for Streams in Multi-Module Memories" Computers, IEEE, Transactions on, vol. 44, No. 5, May 1995, pp. 634-646.

Norton et al., "A Class of Boolean Linear Transformations for Conflict-Free-Power-of-Two Stride Access" In Proceedings of ICPP, 1987, pp. 247-254.

Weiss et al., "Power and PowerPC" Morgan Kaufmann Publishing, 1994, pp. 61-63.

Allen et al., "The Fortress Language Specification" Sun Microsystems, Inc., Mar. 31, 2008, 262 pages.

Stitt, "An Introduction to the Partitioned Global Address Space (PGAS) Programming Model" http://cnx.org/content/m20649/latest/, Last edited by Tim Stitt Ph.D. on Mar 16, 2010 3:49 pm-0500, 12 pages.

Cray Research Inc., 1993, Cray T3D System Architecture Overview Manual, ftp://ftp.cray.com/product-info/mpp/T3D_Architecture_Over/T3D.overview.html., 2 pages.

* cited by examiner

| Field | Max Size (bits) | Function |
|---|---|---|
| Address Translation Fields | | |
| PageSize | 6 | the base 2 log of the size of a page |
| StartingNodeNumber | 64 | the node within a subspace's set of nodes to hold page 0 |
| NodeSetSize | 64 | a mask of the base 2 log of the number of nodes in this subspace |
| IntNodeStart | 64 | the starting node number for this subspace |
| CSS flag | 1 | a bit that indicates this is a CSS node |
| RelativeAddressMask | 64 | a mask that masks out the bits associated with the subspace index |
| PageOffsetMask | 64 | a mask that masks out the page offset for this subspace |
| PageStartBit | 6 | a number to shift off the relataive node and page offset fields |
| LocalSubspaceOffset | 64 | the local address of the first location allocated to this subspace |
| Subtotal | 397 | |
| Error Checking Fields | | |
| MaxNodes | 64 | the maximum number of nodes allowed for this subspace |
| MaxPages | 64 | the maximum number of pages |
| MaxLocalPages | 64 | the maximum number of pages allowed on this node |
| Subtotal | 192 | |
| Total | 589 | |

FIG. 12

HIGHLY CONFIGURABLE MEMORY ARCHITECTURE FOR PARTITIONED GLOBAL ADDRESS SPACE MEMORY SYSTEMS

PRIORITY INFORMATION

This application claims priority from provisional application Ser. No. 61/755,646 filed Jan. 23, 2013, which is incorporated herein by reference in its entirety.

BACKGROUND OF THE INVENTION

The invention is related to memory architecture, and in particular, memory architecture for partitioned global address space memory systems.

A growing number of computer applications require far more memory than may be placed within a single computer. A common solution is to network together many separate computers (each often called a node—thousands or more such nodes in a single system are not atypical). The processor in each node then may run independently and in parallel with those in all other nodes.

How each node views the memory of other nodes is a property of the system's architecture and programming paradigms. The most common paradigm, called Distributed Memory, uses a software package to access data elsewhere, and requires the application code to know on which node resides the remote data that it wants, and where the data is within that node's memory. The node then sends a message to that other node, requesting that data. The target node must receive and interpret the message, and then send a response. This is clumsy since applications must determine if needed data is local or not, and if not, on which node it is.

A second paradigm is the Shared Memory model, where an application program running in any node may reference any data within a Global Address Space without any concern for on which node the data resides. The address used in the access request is completely sufficient to determine where the data resides. Today, this may be done totally in hardware for at best a small to moderate number of nodes, but requires a combination of hardware and compiler/runtime software when the number of nodes grows into the larger system sizes possible today.

An emerging paradigm is Partitioned Global Address Space (PGAS), where, like shared memory, all memory in all nodes is logically placed in a single "global" address space, even though it is physically partitioned into separate nodes. However, unlike Shared Memory, in a PGAS model the program in each node does know that data in the memory that is physically local is in fact faster to access.

A major issue in such PGAS models is this mapping between the logical memory specified by programs running on the nodes and the physical nodes where the actual data lie. Applications where the data consists of many discrete objects, such as an array, may want to place "consecutive" objects in different physical nodes to increase concurrency of processing. Having multiple such arrays where individual objects must be combined allows for a preference for matching objects with the same relative position within the array to be on the same node. On the other hand, different objects that are "separated" by an address stride that is a multiple of the number of physical nodes often results in "hot spots" where contention grows and slows processing. Also, it is desirable to be able to swap nodes for increased fault tolerance. It is also highly desirable for the amount of translation information that needs to be kept at each node to be fairly small (to avoid using up too much resources), and for the test if an address is local or not to be simple in either hardware or software. Also, as new applications such as related to "Big Data" appear, it becomes extremely valuable to partition the memory into different pieces, some of which may contain data that "persists" independent of specific applications. Finally, it is desirable to provide for protection in some manner so as to prevent either unauthorized or erroneous accesses to data.

SUMMARY OF THE INVENTION

The present invention is directed to a system to identify from an address an appropriate target node and a location in that node that holds desired data related to that address. The system includes a logical address generator that generates a logical address. The system includes a subspace index extraction module that extracts a subspace index from the logical address. The system includes a subspace configuration table that retrieves a plurality of parameters of the subspace index to locate the desired data.

The present invention is also directed to a method for identifying from an address an appropriate target node and a location in that node that holds desired data related to that address. The method includes generating a logical address using a logical address generator. The method includes extracting a subspace index using a subspace index extraction module from the logical address. The method includes retrieving a plurality of parameters of the subspace index using a subspace configuration table to locate the desired data.

The present invention is also directed to a system to identify from an address an appropriate target node from a plurality of nodes and a location in that node that holds desired data. The system includes a plurality of nodes, each node includes a memory that stores the desired data. Each node includes a logical address generator that generates a logical address. Each node includes a subspace index extraction module that extracts a subspace index from the logical address. Each node also includes a subspace configuration table that retrieves a plurality of parameters of the subspace index to locate the desired data in the memory of the node.

The present invention is also directed to a method for identifying from an address an appropriate target node from a plurality of nodes and a location in that node that holds desired data. The method includes providing a plurality of nodes, each node includes a memory for storing the desired data. The method includes generating a logical address using a logical address generator. The method includes extracting a subspace index using a subspace index extraction module from the logical address. The method includes retrieving a plurality of parameters of the subspace index using a subspace configuration table to locate the desired data in the memory of the node.

BRIEF DESCRIPTION OF THE DRAWINGS

FIG. 12 illustrates a table of a set of fields per SCT entry for FIG. 11.

DETAILED DESCRIPTION OF THE INVENTION

This invention addresses a highly configurable mechanism for mapping logical addresses in a uniform PGAS space as seen by application programs into physical memory locations in a multi-node parallel computer where each node has only a small partition of the total memory capacity. This mechanism permits configuring different parts of the logical address space to have different properties (including persistence beyond any particular application execution), and access protection that may be a function of the particular application being run.

Background Definitions

For the purposes of consistency in both describing prior art and describing the invention here, the following definitions are made:

A random access memory is a set of locations, each of which contains a fixed amount of information, measured in bits. Each location is known by a number called its address; no two locations have the same address. Unless otherwise qualified, the term "memory" is the same as random access memory.

Today, memories have a set of locations where the addresses are arranged in sequential order, typically starting at address 0. Thus, if there are N locations in a memory, the addresses range from location 0 through location N−1.

The address space of a memory is the set of possible addresses for which it has matching locations.

When an address is expressed as a binary number, it takes $n=\log_2(N)$ bits to have enough values to cover N addresses. By convention, 'capital letters' are used to represent the number of locations in a memory, and a 'lower case letter' is used to represent the number of bits in a binary number that may represent uniquely all those addresses.

The physical address space (PAS) of a physical memory device is the set of all addresses which when presented to the memory relate directly to a unique memory location.

A physical address is an address which falls within the range of a memory's physical address space, and which if presented to that memory will access the associated location.

A processor is an entity that is capable of executing pre-stored programs, wherein the data for the computation is found in some memory and the program being executed will access that memory by computing an address and presenting that address to the memory.

Figure 1:
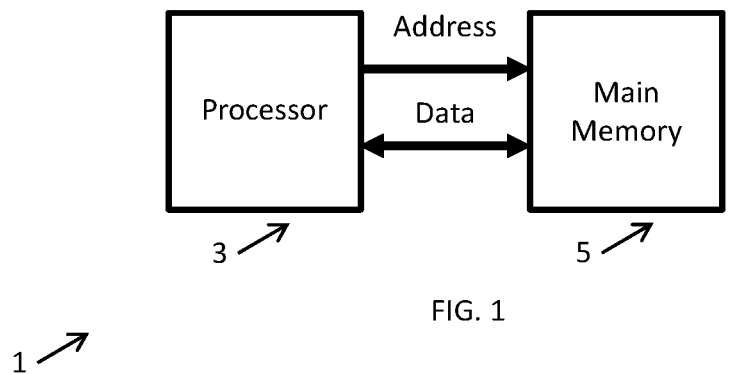
FIG. 1 is a schematic diagram illustrating a single node computer.

A single node computer 1 is defined as consisting of a processor 3 and a memory 5 assembled together in a single unit, as illustrated in FIG. 1.

When executing a program, the processor may fetch instructions from its memory, that in turn direct the processor to compute and generate addresses and access data from other matching locations in the memory. Today, these accesses are either reads (where a copy of the information at a designated address are copied and sent back to the processor) or writes (where the information value stored in a processor-designated location is changed to a value specified by the processor).

Also, today, a processor may be multi-core; there are actually multiple independent logic modules, each capable of executing a program totally independently of all other cores, and each capable of accessing memory independently of all others. However, all the cores in the processor access the memory packaged with that processor.

The main memory of a node is the memory which is directly addressable by instructions executing in the node's processors.

An application address is an address as generated and seen by a program running in a processor.

A virtual address space (VAS) is an address space as seen by a program running on a single processor core for which the application assumes each address has a location that has been paired with it, but where the matching location may, at different times, be found in different memory media, typically either random-access memory or disk.

A virtual address is a form of an application address generated by a processor which lies within a virtual address space that has been set up for the application.

A logical address space (LAS) is an address space that may sit between a VAS and a PAS, with the goal of regularizing a PAS, particularly one that has irregularities such as different amounts of memory on different nodes, or that has redundant resources that need to be "mapped in" as needed.

Address translation logic translates an address as generated for one address space (such as by an instruction in a program for a VAS), into an address in another address space (such as a PAS for the local memory). The address translation function is the mapping carried out by this logic.

A page is a set of sequential addresses from an address space that are guaranteed to be in the same memory. Most page designs have a power of 2 number of addresses associated with them, such 4096 ($2^{12}$).

A page number is the part of an address that identifies which page of memory is being accessed.

A page offset is that part of an address that specifies which address within the identified page is to be accessed.

A segment is a subset of an address space that holds typically a large number of pages, typically with sequential page numbers.

A stride is a constant number that separates pairs of addresses in a sequence of addresses generated by a program that are accessing regularly spaced components of an object in memory, such as from a row or column in a multidimensional array. A stride of 1 typically refers to a sequence of addresses that point to sequential locations.

Figure 2:
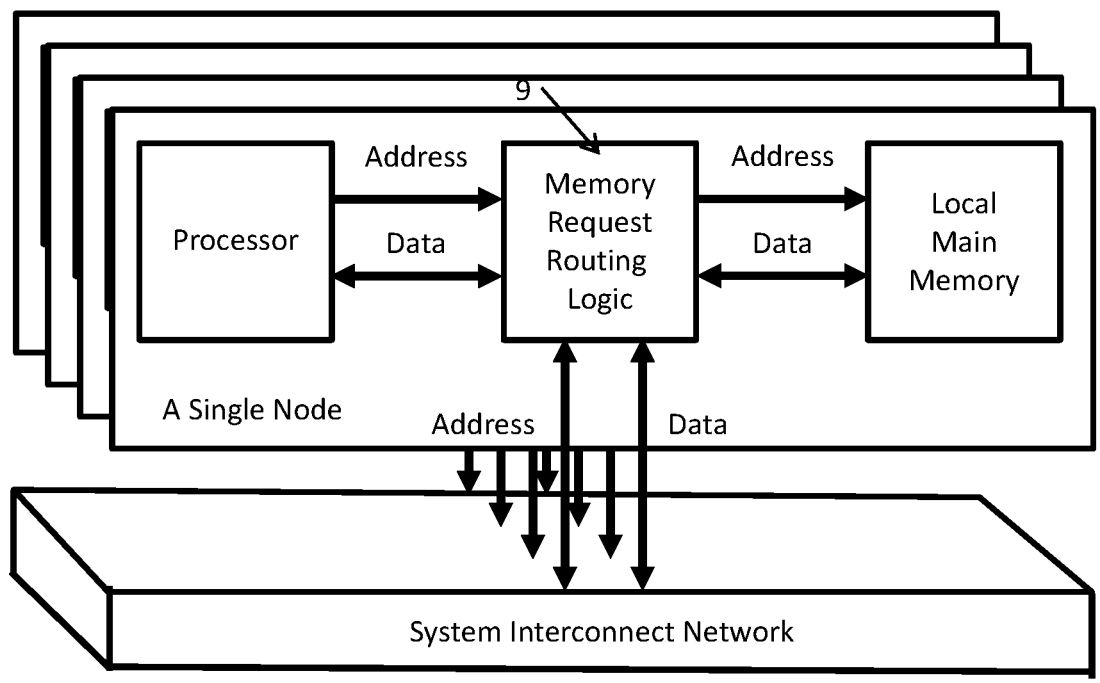
FIG. 2 is a schematic diagram illustrating a multi-node computer.

A multi-node computer, or parallel computer, is one constructed from multiple single node computers, each of which has been augmented with communication channels of some sort, and all connected together through some sort of interconnection network 7, as illustrated in FIG. 2.

A distributed memory parallel computer is a multi-node computer where instructions in one node cannot access memory in another node directly, but instead must rely on specialized software to communicate with a remote node. The software package called MPI (for Message Passing Interface) is one of the most common examples.

A shared memory parallel computer is one where instructions in one node may generate an address for memory in another node. In this case, the address space accessible by a program running in any node is said to be a Global Address Space (GAS).

A Partitioned Global Address Space (PGAS) is one where different subsets of the address space map into physically different memories on different nodes.

In many cases, a PGAS address space is a LAS as described above, with each node indicating at initialization what part of its physical memory is to be mapped into the PGAS.

A global address is an address as generated, and seen, by an application program running in some processor of some node that may represent any memory location in the PGAS memory space available to the application, regardless of on which node it resides.

Depending on the hardware and programming system, a processor's software may treat a PGAS address differently from an address into local memory. It may perform checks on the PGAS address for locality, and if local, convert the PGAS address into a virtual address which is then used to reach local memory.

The network address space (NAS) is the address space used to identify different nodes, and memory within those nodes.

A network address is a specific address within the network address space which if presented to the interconnect network will direct an access from one node to some other node in the system that may handle the access.

In many cases the NAS is different from the PGAS seen by a program in organizing and naming all application data in the system, the VAS seen by the processor in accessing local memory, and the PAS representing the locations for which there is physical memory, with address translation functions used to convert from PGAS addresses to NAS addresses to PAS addresses.

Characteristics of State of the Art Address Mapping Functions

Address mapping functions have been employed in computer architectures for decades. Perhaps the earliest was support of virtual memory, where the high speed physical main memory associated with what was in our terminology a single core single node computer is much smaller than the virtual address space that is seen by a program, but where there is a much lower speed, much higher capacity memory also available. Today, typical examples of the high speed memory is what is called DRAM; the higher capacity memories are either hard disks using rotating magnetic media, or solid state disks made from flash memory.

In a computer employing a traditional virtual memory address translation function, both the fast and dense memories have their locations divided into equal sized pages. The addresses of the locations within each page are consecutive.

Figure 3:
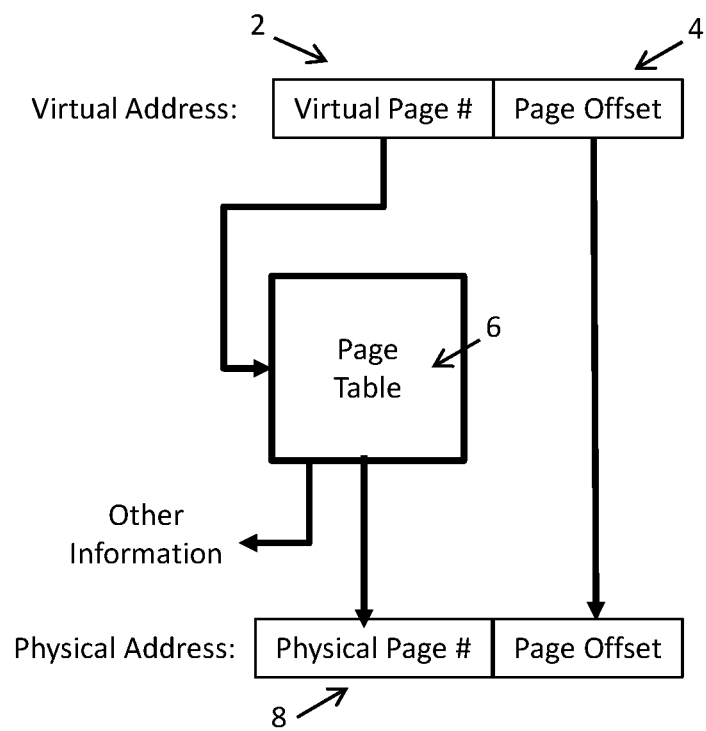
FIG. 3 is a schematic diagram illustrating a virtual to physical address translation function.

A virtual address as generated by the processor is divided into two fields, as illustrated at the top of FIG. 3, called the virtual page number 2 and the page offset 4. Each field in this embodiment represents a substring of bits from the string of bits that makes up the complete address. At any one time, only a subset of the program's virtual pages have copies in the main memory, and the rest are on the disk. Which subset of pages is where may change dynamically during program execution. The Atlas computer of the early 1960s [Kilburn, 1962] was perhaps the first to employ such a mechanism.

The virtual address translation function determines if the page containing a specific virtual address is in main memory or not, and if so to which main memory page. This is typically done by what is called a page table 6 an array of locations, typically in main memory, that determine for each virtual page if it is in main memory, and if so where. Whenever the program generates a virtual address to access memory, the virtual address translation function extracts the page number from the address, and uses this to perform a lookup in the page table with has one entry for each page in the VAS, and that entry indicates if the desired location is in a physical page 8 (and which one), or on disk (and where).

Other information may also be present, such as where on disk the page normally resides, if the page in memory has been changed from what is on disk, or what permissions does this program have to reading or changing location on the page.

In terms of main memory space to hold a page table for V virtual pages there must be on the order of $V=2^v$ Page Table locations. For a modern 64-bit computer with 64 bit virtual addresses and 4 KB pages (where 1 KB=1024=$2^{10}$ bytes), such page tables must be upwards of $2^{(64-12)}$ entries—about the same number as there are atoms on Earth. Clearly, this is impractical.

Figure 4:
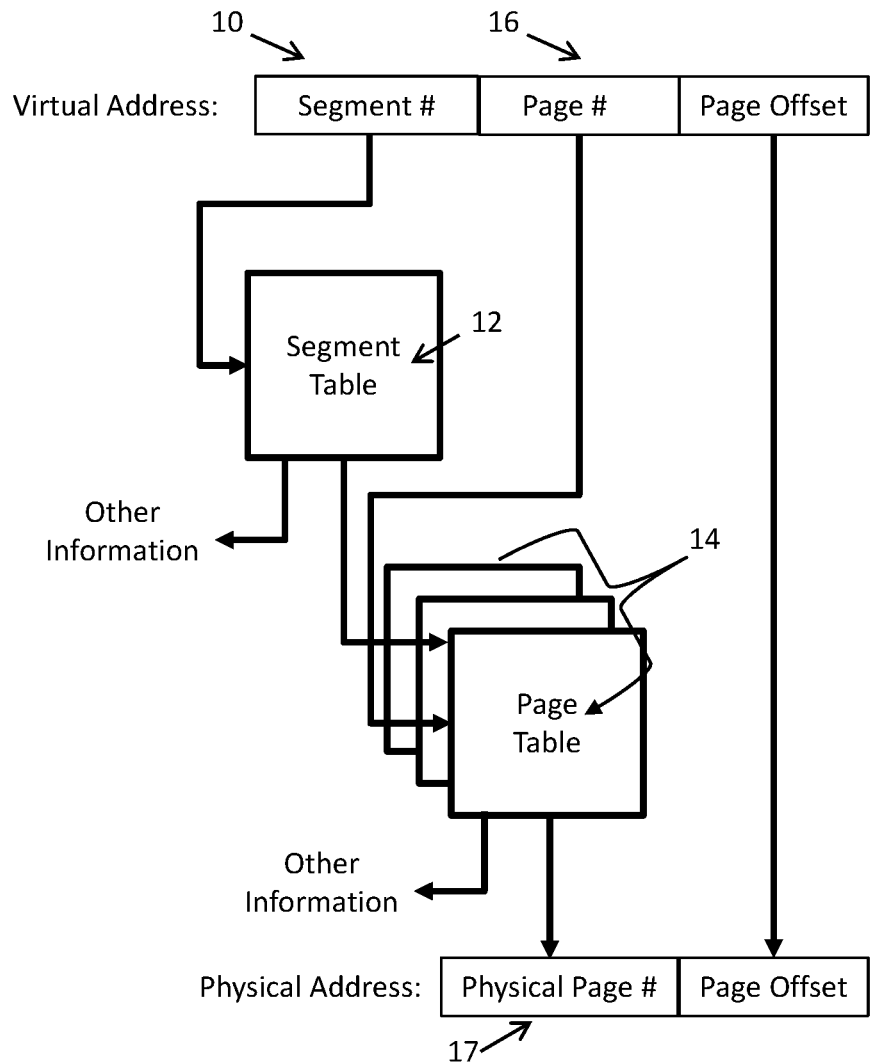
FIG. 4 is a schematic diagram illustrating a two level virtual to physical address translation function.

To avoid this huge memory cost, most modern systems have gone to multi-level translation, where the virtual page field of an address is broken into smaller sub-fields, with each sub-field selecting the origin of a table that manages the translation of the next field. FIG. 4 illustrates a two level virtual-to-physical translation scheme where a segment number 10 indexes into a segment table 12 (typically in memory), which in turn provides the origin for one of several page tables 14 (again, typically in memory), which in turn is indexed by the page number 16 to provide a physical page number 17. In typical systems, many of the segments in an application's address space are unused, so their entries in the segment table may be null. Thus, not only is the size of the page tables 14 much smaller, but the number of them 14 that must be present is also reduced, greatly reducing the cost in main memory of the translation.

An alternative approach to avoiding the cost of implementing many entries in virtual page tables that are never used is to implement an inverted page table where there is exactly one entry for each possible physical page implemented in the computer. This entry includes fields that indicate which virtual page address was matched up with the physical page corresponding to the entry's index, and a pointer to another entry in the table. Conceptually, the table is searched when a new virtual address is to be translated, with the index to the matching entry indicating the correct physical page. For performance reasons, in many implementations the virtual page number from a virtual address goes through a hashing function which computes an initial index into the inverted page table. If the virtual page number in the selected entry matches the actual virtual page number in the address, the appropriate physical page number is the index used. If not, the other field in the entry indexes to another entry which is again tested for a match of virtual page numbers. Multiple such entries may thus be chained together to be tested. The addressing schemes used in the IBM Power and POWERPC architectures supported such an implementation (see [Weiss and Smith, 1994]).

In all these implementations the time cost of performing multiple memory accesses into associated tables to translate each and every memory reference is clearly excessive. To avoid them, a common approach is to implement a small associative memory called a Translation Lookaside Buffer (or TLB) which holds the set of most recently used virtual to physical matchings. When a new virtual address is to be translated, the virtual page number is compared simultaneously by hardware with all of the current entries, and the matching entry returned. Only if there is no match is the full table-based mechanisms invoked.

Figure 5:
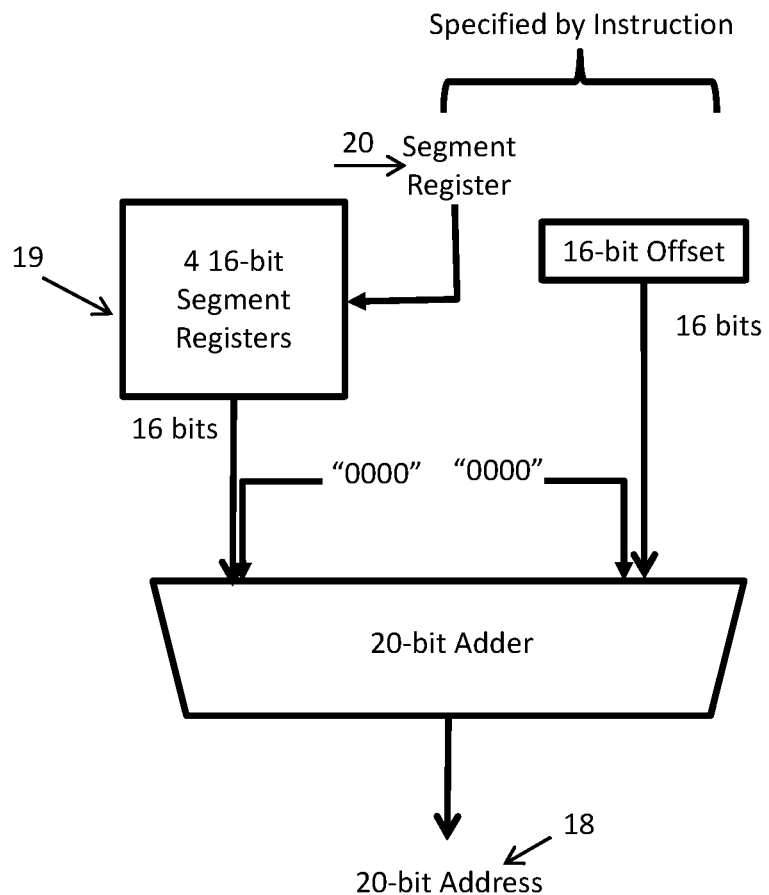
FIG. 5 is a schematic diagram illustrating diagrams segmented addressing as used in an INTEL 8088 microprocessor.

Another type of address translation function goes the other way; it takes addresses as generated by a program from a relatively small VAS, and translates them into addresses for a much larger PAS. Perhaps one of the most famous of these was the segmented addressing model used in the INTEL 8088 microprocessor and later microprocessors what became the processor for PCs. In the 8088, programs generated 16-bit addresses, enough to access a memory space of $2^{16}$=64K single byte locations. To grow this address space, the 8088 included 4 16-bit segment registers 16, each of which was used for different classes of memory accesses to generate a 20-bit physical address 18 as illustrated in FIG. 5. The segment register 20 was shifted left 12 bits, and then added to the program address, and the bottom 20 bits of the sum used for the actual memory address.

Figure 6:
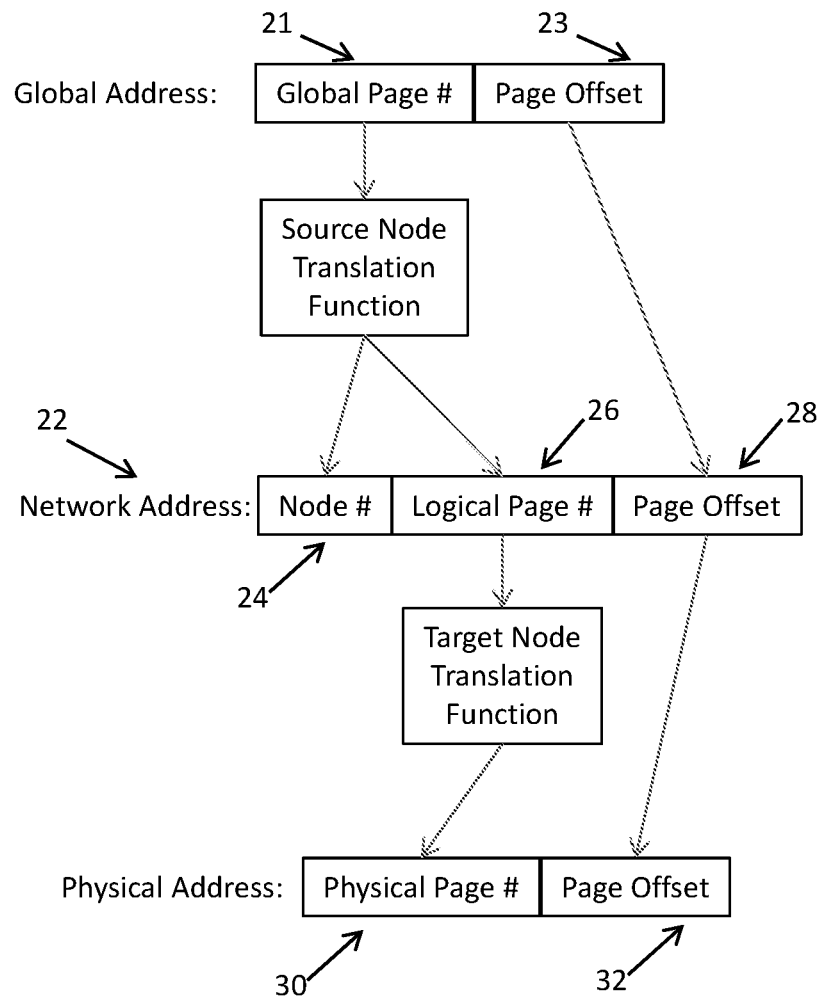
FIG. 6 is a schematic diagram illustrating a global translation function as found in a multi-node system.

The address translation functional requirements for current shared memory multi-node computers is an amalgam of both of the above. With upwards of hundreds of thousands of nodes possible, the aggregate memory available is much bigger than what may be physically attached to a single processor designed for conventional single node purposes (as in a PC), but the address space as seen by a program is still far bigger, specifically with 64-bit addresses. FIG. 6 illustrates a typical translation process. A program running in a source node generates a global address to access a location found in some possibly different target node. The generic fields in the global address are a global page number 21 and a page offset 23. Translation logic in the source node then creates a network address 22 which includes the node number 24, some intermediate logical page number 26, and a page offset 28. When such an address arrives at the proper target node, further translation converts the intermediate page number into a physical page number 30 that may be combined with the page offset 32 to access the actual memory.

Figure 7:
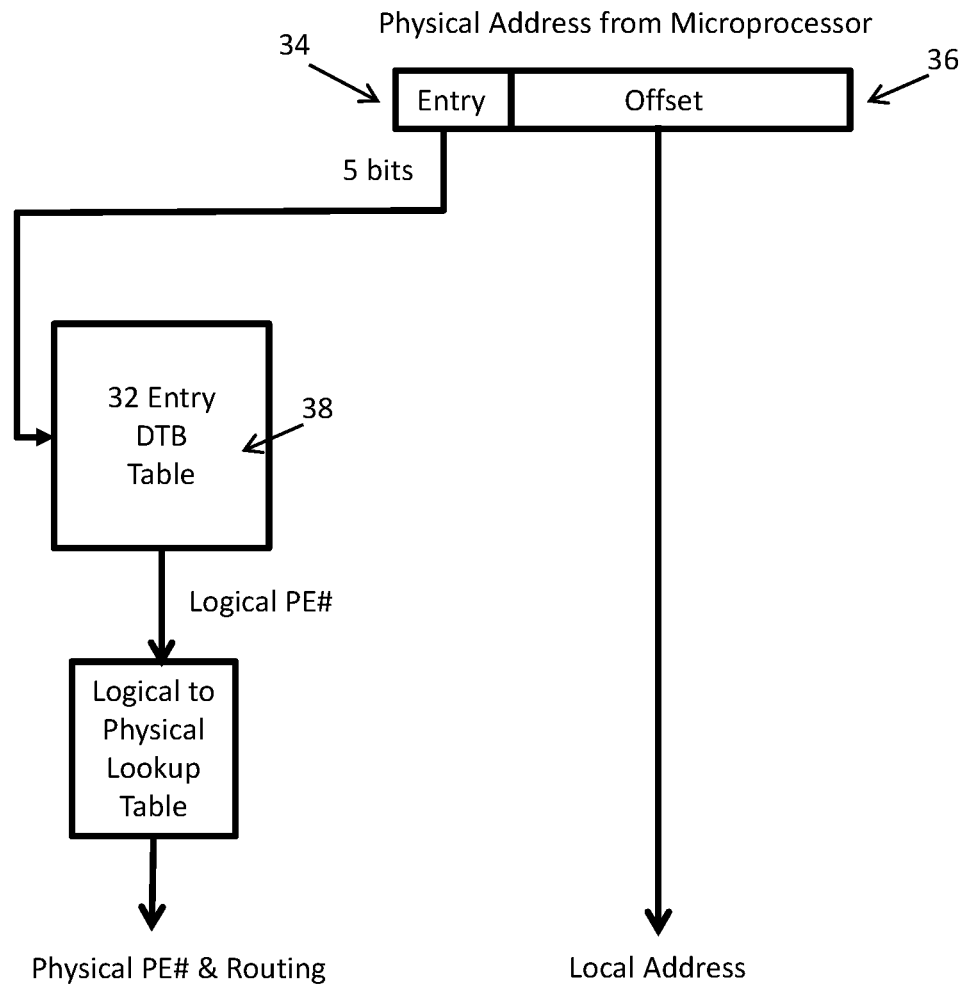
FIG. 7 is a schematic diagram illustrating multi-node addressing in a CRAY T3D.

One of the earliest examples of techniques to handle this was developed for the CRAY T3D supercomputer [Cray, 1993], which may have up to 2048 nodes, with each node holding an Alpha 21064 single core microprocessor and up to 64 MB of memory. This gave a total capacity of up to $2^{45}$=32 TB. While the virtual addresses used by programs were 64 bits in length, the actual physical address that left the microprocessor chip to go to main memory was only 33 bits (plus one bit to distinguish between memory and I/O space), enough to address only 8 GB if used directly. Instead, logic external to the processor chip intercepted the address, and treated 5 bits of it as an entry number 34 and the rest as an address offset 36. The entry number accessed one of 32 entries in a table 38 called the DTB Annex, as illustrated in FIG. 7. Each entry provided the number of the node holding the data and a function code that determines what the logic should do with the address. If the node number from the table 38 matched the node number of the current node, the logic knew the access was local, and made the reference in the local memory. If the node numbers from the table 38 did not match, the request was bundled in a packet that was sent to the correct node, whose logic then made the memory access and, for reads, returned the requested data.

Figure 8:
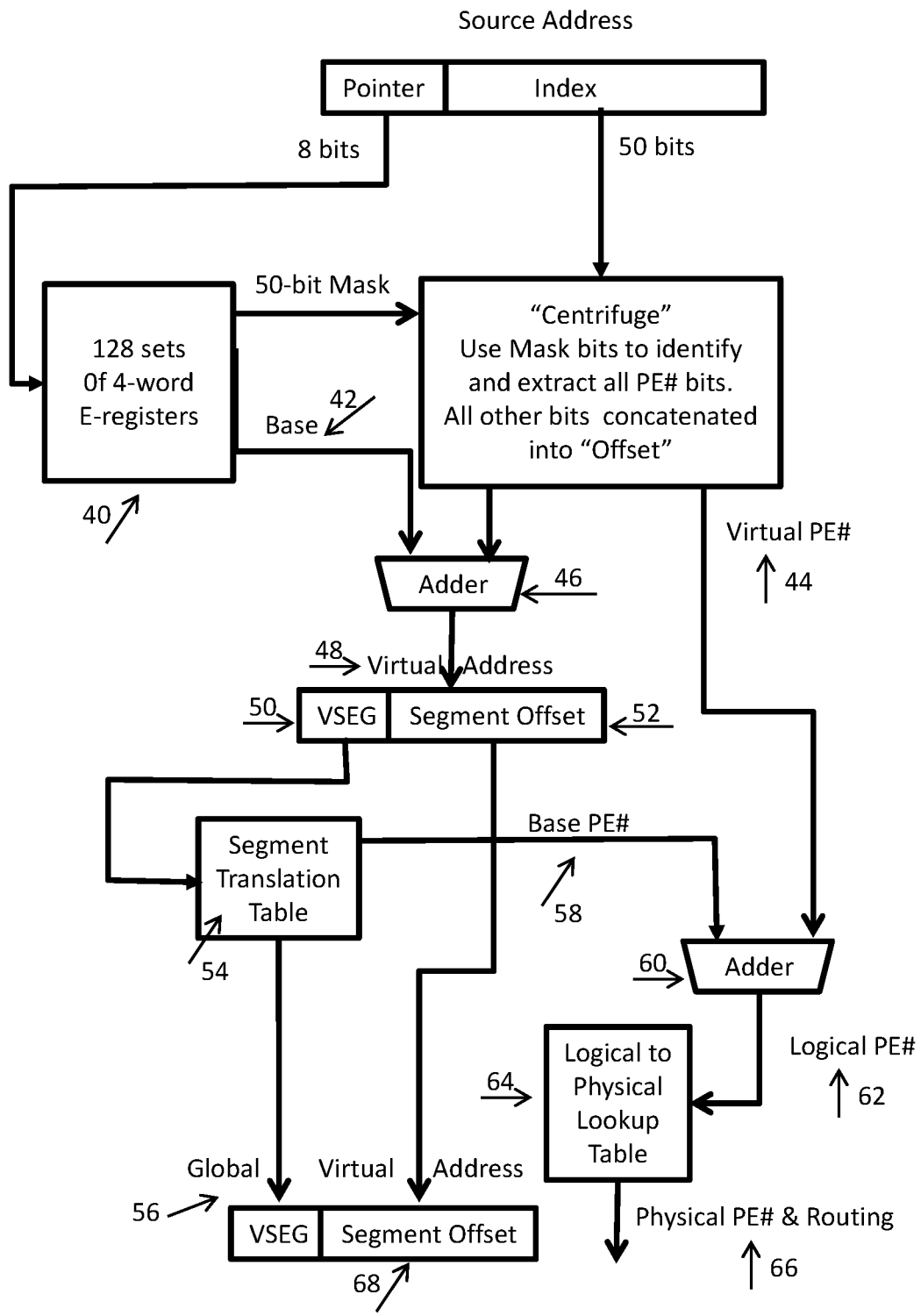
FIG. 8 is a schematic diagram illustrating multi-node addressing in a Cray T3E.

A later version of this machine, termed the CRAY T3E, used more advanced microprocessor chips, but still used external logic to do additional phases of address translation, as illustrated in FIG. 8. This design replaced the DTB Annex by a table of several hundred E-registers, with 4 E-registers 40 dedicated to handling an individual remote access. The microprocessor's virtual address translation mechanism was used to translate virtual addresses that mapped to local memory to physical addresses, and then used the microprocessor's memory bus to access that memory directly. For addresses that were not mapped to local memory, something equivalent to a page fault routine intercepted the access, temporarily suspended the program making the access, and a software routine then sent a command and an address to the external logic. The address in this case consisted of a field to select which set of E-registers 40 to use to translate the 50-bit address index. Information in the E-registers 40 then extracted some sequence of bits in the address index to determine through a mask and shift which virtual PE 44 to target (PE stood for Processing Element and is equivalent to a node in this discussion). This PE id field may come from almost anywhere in the address, meaning that consecutive "pages" in virtual memory may be placed, for example, round robin in a set of nodes. A base value 42 from the E-register set 40 then was added 46 to the remaining pieces of the address index to form an intermediate virtual address 48, which in turn was assumed to consist of a virtual segment number 50 and a virtual segment offset 52. The virtual segment number 50 then indexed a segment translation table 54 to deliver a global segment number 56, and a base PE number 58 to add 60 to the virtual node number to create a logical PE number 62, which in turn indexed a separate lookup table 64 to derive the actual physical PE number 66.

The combination of the physical PE number 66, global segment number 56, and segment offset 68 then represented the network address presented to the interconnection network. At the target PE the global segment number 56 and segment offset 68 went through yet another Global Translation Buffer to perform another page-based translation step and deliver a local memory address.

A separate issue in all these designs was how to handle "hot spots" where a large number of processors in a system generate addresses that are separated from each other by a common stride value, as when a column is to be accessed from a matrix or array that is stored so that the elements of each row are in consecutive locations, but where this stride value happens to be a multiple of the number of nodes over which the array is distributed. In such cases a large percentage of the addresses generated by a program map into locations on the same node, so that even though they are "different" there is significant contention issues at the node (as the series of independent accesses must be handled serially), and little performance gains due to parallelism is achieved. This is particularly severe for systems with "powers of two" number of nodes, which is common in many modern designs.

For further discussion, it is assumed that a network address has three components: a node number, a page number within that node, and a page offset within that page. In many systems, the bits from the original application global address that represented the node number were found very close to the page offset, in the middle of the virtual page number. This was so that "sequential" pages in the original address need not be on the same node, but each node may still host a large number of pages. If the stride in the application was of value $2^t$, where t is larger than the largest bit making up the node number, then repeatedly adding a stride (which is a multiple of $2^t$ to the address) would never change the part of the address that determined the node number, thus targeting the same node over and over, and creating a performance hot spot.

An example of one of the earliest solutions to this problem was used in the Burroughs Scientific Processor BSP [Kuck 1982], where there were 17 memory modules, and all addresses were "divided by 17" within the address translation process to determine which memory to address. This essentially "spread" the bits making up the node number all over the page number. Now the only strides with a hot spot problem were multiples of 17, a very uncommon occurrence in real applications. The logic to divide an address by 17, however, was specific to the number 17 and did not generalize well to other numbers of nodes or other page sizes.

A more flexible approach was developed by Norton and Melton [Norton, 1987] and used in the IBM RP3 system. In this case, the entire virtual page number is treated as a vector of bits and multiplied by a binary matrix with special properties. The matrix-vector multiplication operation here used logical AND instead of a multiply, and a logical EXCLUSIVE OR in place of an add. The result of the multiply included a d-bit field for the node number. When the matrix is properly constructed, adding a series of any power of two to an original address will cause the translated node number to cycle through all the nodes, and not generate a hot spot. As with the BSP, the "node number" is essentially spread through the entire virtual page number.

The Tera Computer System [Alverson, 1990] represented a multi-node computer where the address mapping was designed into the processing core, and this kind of address transformation via binary matrix multiplication was included in the translation process.

It should be noted that in most of these mechanisms the translation information, such as the page and segment tables, are associated with a particular program and not shared. When a program is started, this information must be initialized, and when the program terminates, the information is thrown away. None of the information survives the program's execution. Also, if different programs are to "share" some subset of the same memory, their individual translation tables must be set up so that entries that should be the same point to the same physical pages, and that the operating system knows that such pages cannot be moved without changing all sharing programs.

Protection Mechanisms

Another function of memory translation mechanisms is to provide information as to whether or not different types of accesses are to be permitted against different memory locations. Such permissions typically cover "read," "write," and "execute," where "execute" permission means that the location(s) hold pieces of programs that may be executed. Different sets of memory locations may hold different combinations of permissions.

Today, one of the most common arrangements is for each page table entry, or segment table entry, to include a set of bits, one for each permission type. When a running program generates a virtual address, the resulting permissions are compared with the kind of access the program is trying to make, to determine if that kind of access is to be allowed.

It is noted that such permissions are associated with the program accessing the data, and not the data itself. Thus, if two programs wish to share data, getting the permissions right must be done via explicit calls to the operating system, and some active involvement of special programs designed to deal with shared data.

Characteristics of Shared Memory Programming Models

Today, one of the most pervasive programming models for writing applications to run on multi-node parallel computers is the SPMD (Single Program Multiple Data) where each node has a copy of, and executes, the same program, with the global data distributed in pieces over each node, and the application knows which node holds the non-local pieces. Conventional programming languages such as C or C++ are used here, with libraries such as MPI (MPI Forum, 1993) used to support the application when it wishes to access one of these other pieces. As mentioned above, the address mapping function for this model is implemented nearly completely by the application in application specific code.

The first of the programming models that began to present applications with a shared address space (and thus remove at least some of the address mapping code from the application) did so via shared memory libraries. Examples include SHMEM (Barriuso, 1994), ARMCI (Nieplocha, 1999), and GASNet (Bonachea, 2002). With these libraries, a node that wishes to run a part of a parallel application will broadcast to all other participating nodes both its desire to participate and a region of its virtual address space that it wishes to contribute to the global address space, and then use addresses consisting of node number and offsets to specify accesses to non-local memory. These offsets were treated as offsets from the start of the virtual memory contributed by the application running on the target node, and after added them to the base of the block were subject to the node's standard virtual address translation mechanism, as configured for the local application.

A series of programming languages where the process of address translation is largely hidden from the programmer began with Split-C (Culler, 1993) and UPC (Carlson, 1999), and continued through modern languages such as Chapel (Callahan, 2004), Fortress (Allen, 2005), and X10 (Ebcioglu, 2004).

Both Split-C and UPC have the notion of each node hosting a piece of the address space, but not necessarily a completely sequential segment as in the earlier libraries. Both also provide the programmer with two kinds of pointers: one where the designated address is known to be local (or "private"), and one where the address may point to anywhere (global). In addition, UPC has the capability to specify on an object by object basis how a series of addresses pointing to "sequential" components of a data structure may be distributed around all the nodes. This is done by specifying how many sequential components reside on node i before the next component is found on node i+1. The compiler is responsible for converting addresses into node numbers and offsets when the program is executed.

In none of these cases may data in memory persist beyond the execution of the program. The existence of the data and the associated address spaces are tied directly to program execution.

The more modern languages are similar, but with some additional options for the mapping.

Implementation Issues and Design Metrics

An obvious implementation issue for a translation mechanism is the cost of the implementation, as measured in logic and also in memory. Of particular concern is the implementation cost that comes about in several places:

How big is any associated translation information, such as page tables, that must be kept in the main memory of each and every node for reference by the translation mechanism. Having large numbers of copies of the same data in a large number of nodes clearly uses up a lot of memory that may be used for data, particularly if there are many nodes, each of which need their own copy.

How many tables or similar structures must be implemented in the translation logic path, such as E registers or various other lookup tables. In today's technology such structures must be implemented by SRAM technology, something that is considerably less dense than the DRAM for main memory, and draws considerably more power.

Clearly the amount of memory of either kind in a design is a metric.

A related issue is how much of this logic and memory must be in any possible source node, and how much must be in any possible target node.

Another implementation issue deals with the costs of either integrating the address translation mechanism into a new processor design (as with the Tera above) or the cost of retro-fitting it to fit around an existing processor design that already had some sort of (single node) translation mechanism embedded within it (as with the T3D and T3E above).

Time to perform a translation is another issue, both in terms of passage through logic dedicated to the translation and to additional software actions that must run in the associated processors that generate the addresses (as with what must happen on a T3E when a non-local address is discovered, and the processor must send out commands to the E registers to complete the process). For addresses that translate to locations on remote nodes, the time to handle the translation on both the source and target nodes is a metric.

Of additional concern in many designs is not only the implementation costs associated with a full address translation but also the costs associated with simply doing a check that a particular address does in fact map onto memory that is local to the current node performing the check. Having a low cost check is valuable in at least two circumstances:

when a program has generated an address in the past that was in fact determined to be local and then simply modifies it slightly, and when a request from a foreign node arrives at a node, and the node wishes to verify that in fact the address does map to a local location.

Next are metrics dealing with the robustness of the possible mappings supported by the translation mechanism:

What are the smallest and largest blocks of local memory that may be mapped into sequential addresses in the original address space?

How can consecutive blocks of addresses in the original address space be located in different nodes in ways that prevent hot spots due to certain stride values?

Must all nodes participate in holding parts of memory for a single address space, or may certain nodes handle certain segments of the address space, and other nodes handle other segments? May these node sets that handle different segments overlap but not be the same?

In addition, issues associated with fault tolerance and error detection are important:

Is it possible to have extra physical nodes that may take over when other nodes are found defective?

Also, may such memory mapping be made "independent" of any applications that come and go, so that data such as shared databases that should exist independent of other applications may be easily configured and made persistent? Associated with this are protection mechanisms to control access to data.

A Configurable Address Translation Function

This invention presents a method to organize a set of address translation functions designed for shared memory multi-node parallel computers that support a PGAS logical memory address space with the following characteristics:

support systems with possibly very large numbers of nodes, especially where the cost of implementation at each node may be a significant concern. Of particular interest are node designs that may be quite small (perhaps a single chip or less) in comparison to modern designs, which may have 100+ silicon chips associated with all the processor, memory, and communications functions of a single node.

allow selectable parts of the address space to be persistent, that is for the lifetimes of the associated data to outlive a single program.

allow the mapping between logical to physical addresses to be different for different parts of the address space, allowing different well-defined regions of memory to be mapped in ways that are optimal for different types of data structures.

allow parts of the address space to be sharable among several programs at the same time.

allow parts of the address space to have local copies of data at each node, but still be able to distinguish between, and access, these independent copies.

provide for a simple low cost check that an address is local (i.e. on the current node) or not.

provide a range of protection options for accesses to different regions of the memory.

This logical address space is thus a property of the system, and not of the particular programs that may be running on the system at a particular point in time.

It is expected that in normal practice a particular processor in a particular node will present addresses in this logical address space to memory request routing logic in the node as illustrated in FIG. 2, along with a command that identifies what operation is to be run against the resulting location, and application identifier (termed AID here) that identifies who the requesting application is.

While the scope of possible commands are expected to include read and write, it is not limited to such, and may in fact include many other operations, even programmable functions to be executed remotely, such as practiced in U.S. Pat. No. 7,185,150 (Kogge, 2007).

While the term "logic" is used below to define how the invention's translation functions are implemented, it is understood that any subset of these functions, up to and including all of them, may be implemented in software, albeit at reduced performance.

The logic 9 illustrated in FIG. 2 will determine if an address presented to it is local or not, and if not, what the target node is. If it is not local, the logical address is at least partially translated, combined with the type of desired access and associated return information, and sent via the system's interconnection network to the correct node. In either case, when the logical address is known to be resident at the current node, it is again interpreted to derive a physical address.

Figure 9:
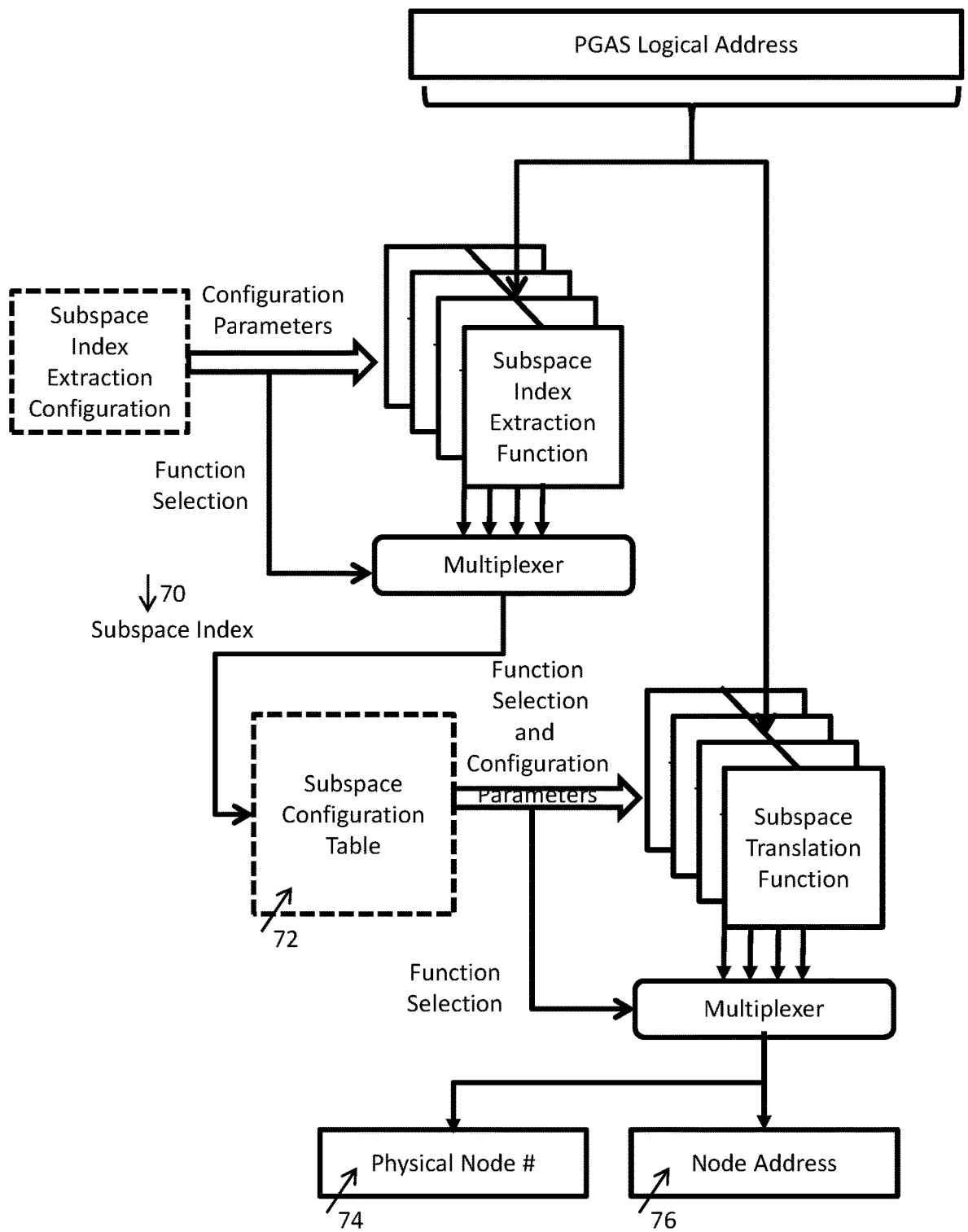
FIG. 9 illustrates a schematic diagram illustrating a notional logical address and the translation process for the presented translation mechanism.

FIG. 9 illustrates a notional description of the address translation process as implemented by this invention. The concept of a subspace is key to this process. Each subspace is a set of sequential addresses in the logical address space that normally does not overlap any other subspace. Together, the subspaces notionally cover the entire logical address space. Further, each subspace has properties that may be totally different from the properties of other subspaces. These properties include how addresses of locations within the subspace are mapped to physical addresses, which applications may access such locations, and in what way. It is important to recognize that these properties, while configurable, exist at the system level and are independent of applications that may run on the system.

The logical translation mechanism represented in FIG. 9 takes a logical address and extracts from it, in stages, several pieces of information:

a subspace index number,
a physical node number,
a node address, and
access rights.

The subspace index number is simply an index that provides access to the configuration information associated with a particular subspace. It is used to access a small table duplicated at each node that holds a description of the translation functions needed to derive the other parameters: physical node and node address numbers, and access rights. In addition, there is nothing to prevent different system implementations or applications from superimposing on top of this logical address space a layer of a more traditional virtual address space that is translated separately by traditional means.

For this invention, a simple preferred approach to the net effect that these functions implement makes the following assumptions about each subspace:

Each subspace is a set of logical addresses that map into logical pages, where each page is a subset of sequential addresses in the logical address space.

Different subspaces may have different page sizes and/or different ways to determine specific page sizes. Typically, but not mandatory, all pages for a specific subspace have the same size.

No two logical pages ever overlap in logical addresses. Thus, each logical address is in at most one logical page.

Sequential logical addresses within a logical page are mapped into sequential addresses within some unique node's local memory.

The set of nodes used by a subspace to hold pages is a subset of the set of all available nodes. Different subspaces may have different subsets of nodes, but these subsets need not be disjoint. Thus, nodes may contribute memory to more than one subspace.

Each node holds some number of pages for a subspace. It is typical, but not mandatory, that each node hold the same aggregate amount of memory dedicated to a particular subspace as all other nodes in the subspace's set. Also it is typical, but not mandatory, that the pages for a subspace on a node be found in a block of consecutive addresses in local node memory.

The block of memory corresponding to a physical node's contribution to a subspace need not start at the same address on each node.

Page 0 in a subspace may be mapped into any one of the nodes making up the subspace's node subset.

Two successive pages by logical address are mapped to different nodes of the set.

If there are S nodes in a subset of nodes for a subspace, then each of S pages that are in consecutive order in the logical address space are mapped to a different one of the S nodes. It is not necessary for the same mapping be used for every set of S consecutive pages.

It is highly desirable for error detection purposes that the logic be able to determine when a subspace address is invalid, that is it is beyond the mapped limit.

It is possible, on a subspace by subspace basis, to determine if a particular application is allowed access to that subspace.

It is possible for a node address, when presented at the appropriate target node, to go through some other node-specific translation. For example, such translation may be like a conventional virtual to physical address translation, allowing part of the contribution of a node's memory to some subspace to reside on disk or other secondary mechanism, such as flash memory. However, this translation is set up by the node, is the same for any application running on that node that refers to the same logical address, but may be different from node to node.

The actual process of deriving a subspace index from a logical address is irrelevant to the rest of this patent, but may be done simply in at least one of several ways:

The index of the subspace may be derived by looking at a specific subset of bits from the address, as is practiced in identifying pages or segments in typical virtual memory systems. In this case, all subspaces are of equal size in terms of number of logical locations in them, and the number of subspaces is at most two to the power of the number of bits in the subspace field.

The index of the subspace may be derived by the logical address falling between two boundary addresses: a lower and a higher one, as practiced in routing in networks such as PCI Express. Now, the number of subspaces is fixed by the number of boundaries, but the size of each subspace is very flexible, and independent of any other subspace.

The index of the subspace may be derived by a set of logical addresses and mask pairs. An address is a member of a particular subspace if it matches the address in some pair in all bit positions where the mask is a "1." The number of subspaces is again the number of pairs, and the size of each subspace is again flexible, but will be a power of 2.

The logical address may be multiplied by a binary matrix as in the IBM RP3, with some of the product bits designating the subspace index.

In the first case, the number of bits used to determine subspace may be either fixed when the machine was designed, or set by a configuration process when the system is booted, and made available to all nodes. In the latter cases, the associated set of extraction values must also be duplicated at all nodes. In all cases, these values may be free to be changed whenever the system is reconfigured.

As practiced by this invention, it is possible that all of these functions are implemented in a single system design, with a global parameter set when the system is booted on that is to be used to determine which function is to be employed to find subspace indices. In such a system, it is even possible to configure the entire set of nodes into distinct partitions of nodes, where all nodes within one partition use the same subspace extraction function, but that a different partition may use another.

In any case, once the subspace index 70 has been extracted from a logical address, the parameters of that subspace must be retrieved. The simplest and preferred implementation uses a small table in each node to contain the information, which is loaded onto each node when the system is booted or reconfigured, and is independent both of the programs that may run on it and of the number of nodes in the system. For this discussion, each such table is called a subspace configuration table (SCT) 72.

For this exposition, the following several categories of addresses or address components are referred to:

Logical address: the address as presented by the processor, such as a logical address generator, making the request.

Relative address: the logical address with the subspace index stripped out, leaving an address that is "relative" to the origin of the subspace in the logical space, that is relative address "0" is the first location in the subspace. In particular, relative page number and relative page offset refer to the components of the relative address that refer to which page within the subspace and which location within that page the original logical address referred to.

Intermediate node or page number: a partially translated address part way between logical/relative and final physical/local. A common intermediate node number may be an index to the k'th node in the set of nodes associated with the current partition of nodes.

Physical node number 74: the actual number or tag of the node to be targeted by this request, out of all the nodes in the system. This would be the same value needed to route the request through the system's interconnect.

Node address 76: the page number combined with the offset gives the address that, if it had been presented by the target processor, would point to the correct location in the target node's memory. These are not called physical addresses because there may be additional local conversions, such as conversion to RAS/CAS format when talking to a DRAM memory, that happen as a matter of course.

Figure 10:
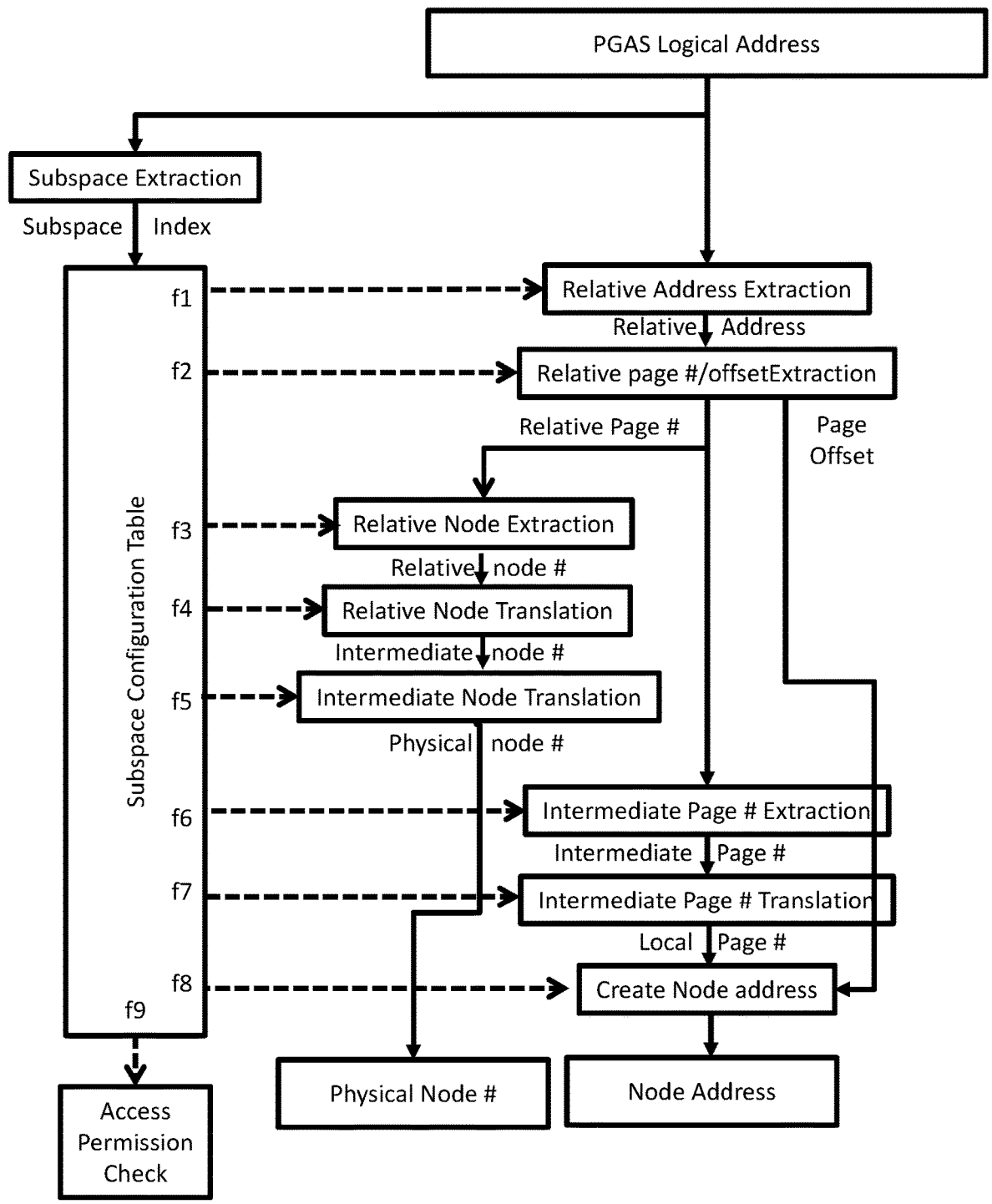
FIG. 10 illustrates a schematic diagram of a suite of steps that may be performed in the process of translating an address for the presented translation mechanism.

As illustrated in FIG. 10, the information in each entry in the SCT controls several functions to use for translating logical addresses for the entry's corresponding subspace, once that subspace has been identified:

A function, labeled "f1" to extract a relative address from the logical address. This relative address starts at the beginning of the subspace.

A function, labeled "f2" to extract a relative page number and a page offset from the relative address. The relative page number indicates which logical page within the subspace the address refers to. The page offset indicates the location within that page.

A function, labeled "f3" to extract a relative node number from the relative page number. This relative node number will be used to identify one of the nodes from the set of nodes associated with the subspace, as if those nodes were labeled from 0 to $N_S-1$, where $N_S$ is the number of nodes in the subspace's node set.

A function, labeled "f4" to convert the relative node number to an intermediate node number which identifies which node out of all of the nodes $N_{total}$ available for use in this partition in the system, again notionally labeled from 0 to $N_{total}-1$.

A function, labeled "f5" to convert the intermediate node number to a physical node number that relates to the node number that would be used by routing hardware to find the correct target node in the physical system.

A function, labeled "f6" to extract an intermediate page number from the relative page number.

A function, labeled "f7" to translate an intermediate page number to a local page number.

A function, labeled "f8" to combine a local page number and a page offset into a node address to use to access memory at the designated physical node.

A function, labeled "f9" to identify if the current request is in fact allowed to be performed in this subspace at the requested node.

While shown as performed sequentially in FIG. 10, it should be obvious to those practiced in the art that different steps may be done in different orders, may be combined, and/or may be done part on the originating node and part on the final target node. It should also be obvious that well-known techniques, such as TLBs (Translation Lookaside Buffers), may be used to avoid or accelerate some or all of this process for the translation of addresses that may have been already translated.

A possible implementation choice for the first function, f1, is strongly related to the function used to extract the subspace index. Here, the result is notionally an address that represents a location "relative to" the start of the associated subspace. For the case where certain bits are extracted for the index from the logical address, we need only mask those off, and use the rest of the logical address. For the case where there is a boundary check between sets of boundary addresses, we may subtract off the lower of the two boundaries. For the case of matching a value under mask from a set, the relative address is the compression of the logical address resulting from the removal of the bits not masked for the index. For the case of the binary matrix multiply, additional product bits from the multiply may give the result directly.

The second function, f2, to extract a relative page number and offset, should keep consecutive logical addresses that should fall within the same page to remain consecutive. The most common implementation of such a function is to divide the relative address by the page size, and keep the quotient as the relative page number and the remainder as the page offset. If the page size is a power of two, say $2^p$, this is simple—a mask with p "1s" to select the lower address bits and a shift right by p bit positions to drop off the page offset and align the relative page number. If the page size need not be a power of two, a more expensive division circuit is needed, although for certain values specialized circuits are possible (as demonstrated in the divide by 17 circuit used in the Burroughs BSP discussed earlier). If there is only one page per node for this subspace (a possibly valuable option), then no division is needed.

If a binary matrix multiply was used to find the relative address, different parts of the product may also be used to provide the relative page number and offset directly.

In any case, there should be a check that the relative address is valid. This may be done by comparing the relative address to a maximum address for the subspace, or by comparing the relative page number to a maximum allowed page number for this subspace.

The third function, f3, to extract a relative node number from the relative page number, is similar to the prior function, except using the count of nodes in the subspace in place of the page size. If a matrix multiply was used for f1 and f2, yet a different set of product bits may be used to derive the node number. Even if a binary matrix multiply was not used in f2, a possible option is to use one for step 3, particularly when a "random" shuffling of nodes for sequential pages is desired, as was the case for the RP3.

Possible choices for the fourth function, f4, to convert the relative node number to intermediate node numbers, include at a minimum:

no translation at all, if relative node numbers are in fact to be treated as physical node numbers, or addition of a base node number (which is less than the number of nodes $N_s$ allocated to the subspace) to the relative node number, modulo $N_s$, or binary multiplication by a randomization matrix number as in the RP3.

The fifth function, f5, to compute a physical node number from the intermediate node number, may often be combined with the third f3 and fourth f4 functions, and f5 may itself be in steps, including some combination of:

adding a base node number to the intermediate number, or using the intermediate node number as an index into a table that maps it to a particular logical node, or multiplying the intermediate node number again as in the RP3, but to scatter the nodes over a bigger set.

In all cases, a final sub-step of f5 that may be useful for fault tolerance is to use the number that comes out of the above process as an index into another table that maps the number to a physical node number, or to compare it to a set of a few pre-stored node numbers to replace some number of defective physical nodes (a similar mechanism is practiced in decoding around bad rows in a DRAM memory array, as practiced in for example (Takemae, 1982)).

Then, this physical node number may be used to route the request to the proper physical node. Typically, this routing involves checking first if the destination node is the same as the current node sourcing the request. This check may in fact be possible to do earlier, by keeping in each node, for each subspace, the relative or intermediate node number that this node represents. A match may short-circuit the translation process since the current node is the target. Also, some part of these first five functions may be duplicated at the target node once a request arrives at a destination node, as a validation check that the destination node agrees the request is in fact targeted to it.

The sixth function, f6, factors out of the relative page number the information associated with the intermediate node number, leaving an intermediate page number. As before, the range of functions possible here include those described for the second function, f2, except that the page size is replaced by the total number of nodes associated with this subspace.

The seventh function, f7, translates the intermediate page number to a local page number that is relative to the destination node. This may be as simple as addition of a node-specific base value, up to having the processor native to the node using its internal memory translation system.

The eighth function, f8, converts this into a physical address. This function may often be combined with the prior function, and in most cases will be performed at the destination node, which has node-specific information. The most common implementation may multiply the local page number by the size of a page, add in the page offset, and then add in a base value.

Finally, any practical system needs to verify that the type of request being made is in fact permitted. This may be as simple as assigning access rights (such as read or write) as a function of each subspace, independent of the application making the request. More versatility may be provided by appending an AID number to each request that then indexes into a small bit table associated with each subspace to provide the acceptable rights for that application in that subspace.

These checks may be made at the node generating the request, in which the access rights being checked are considered global to all nodes participating in the subspace. More versatility may be provided by making the check at the destination, so as to allow a fine grain node-by-node check. In fact, a system may decide to perform both a global check at the source, and a local check at the destination. Expanding the AID to have two fields which are used to perform each of these checks may also be of value. An Application Class may identify the global class of applications the current application belongs to, and an. Application Specifier may identify the particular application within the class to which the current application belongs, and thus its particular permissions. The first would be used at the source; the second at the target.

As an additional capability, for many applications it may be desirable to have common, but node-specific, program-relevant information present at each node. This is particularly useful for parallel run-time functions supporting SPMD (Single Program Multiple Data) programs such as for copies of application code, available local memory for dynamic heaps, node-specific diagnostic or performance monitoring information, and the like. In such cases, a program is assured that, at whichever node it happens to be executing, if it accesses "the k'th location in the local common area" it may get it locally, without having to figure out exactly which node it is on or what the translation process is. Subspaces that hold such duplicated information are called or known here as common support subspaces (CSS).

There are several elegant mechanisms to do this within the bounds of the above. For example, a special marking module, which may be a bit, simply designates one subspace, say subspace 0, as the CSS where all addresses are treated as offsets into the local memory dedicated to the subspace. Then an instruction such as Compute Local Address (CLA), which may be a new instruction or specialized instruction sequence, may produce and return a valid logical address which, if used as a reference, would access that relative location on the current node when passed through the standard address translation.

In a more versatile approach, an extra bit may be associated with each subspace that indicates whether it may be considered a CSS or not, where the bit corresponds to the marking explained in the preceding paragraph. If so, then when a reference is made to this subspace, the node number that comes out of functions 2, 3, 4, and 5 are suppressed, and replaced by the matching node number of the current node. Such addresses would thus always be local.

To allow access to a node's CSS from some other node, a second subspace may be constructed with all information identical to the one with the CSS bit set, but with the CSS bit not set. Now, presentation of an address within that subspace from any node would extract the node number as usual, and go to the correct node. Again, a CIA-like instruction may provide to the running code an address where the proper node number has been inserted.

Such mechanisms make the most sense when there is only one page per node, and thus any reference will always be to an area of memory on the node that is laid out in exactly the same fashion as on every other node.

Figure 11:
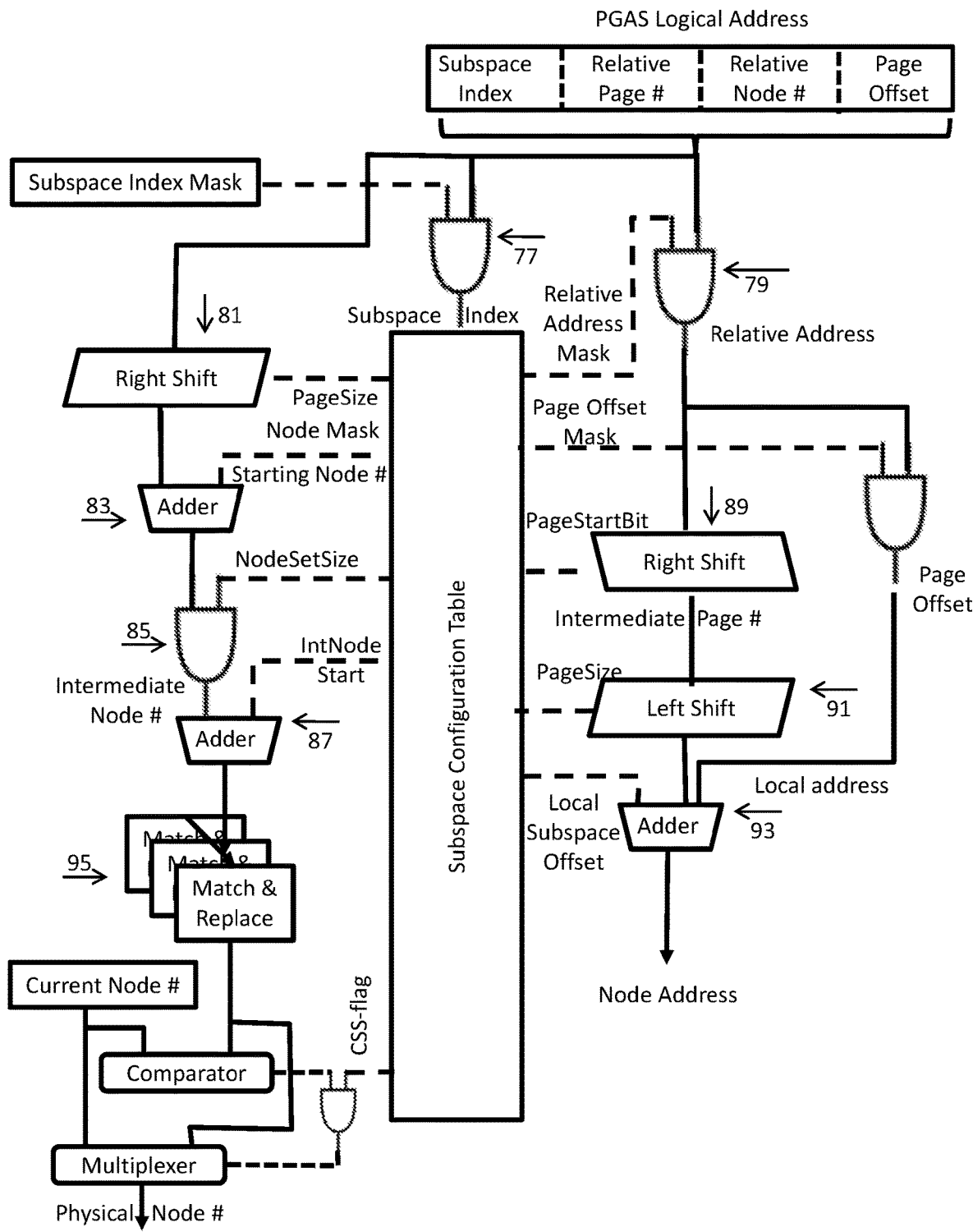
FIG. 11 illustrates a schematic diagram of an implementation of the presented translation mechanism.

FIG. 11 illustrates an example implementation of the translation process with the following constraints:

The subspace index bits always come from the most significant bits in the logical address, and may be any number of bits up to the maximum of the $\log_2$ of the number of entries in the SCT.

All pages in a subspace are the same size, and are any power of two in size up to a number that fits within the address bits not used by the subspace index.

A local address consists of the bits for the relative page number concatenated in front of the bits for the page offset.

A node address is a local address added to some base value. Thus, all addresses for a particular subspace on a particular node are mapped into a sequential set of physical addresses.

The number of nodes per subspace k is $N_k$, and may be any number that is a power of two, except when there is only one page per node, when there may be any number of nodes. The only constraint is that the number of nodes cannot exceed those expressible by the number of bits left over from the bits used for page offset and subspace index.

The nodes for subspace k are labeled subspace nodes 0 to $N_k-1$, and the node that holds the first page in the subspace may be any one of these nodes.

The node that holds page i+1 has a node number within the subspace of 1 plus the node number that held page i, modulo $N_k$.

All the nodes in the system are labeled 0 to $N_{total}-1$, with the nodes for subspace k taking on some $N_k$ of these nodes, in sequential order.

The only exception to this sequential numbering is that some number of nodes in the sequence may be replaced by other nodes, up to some implementation-dependent maximum. This replacement may typically apply uniformly to all subspaces to replace faulty nodes.

If a segment is labeled a CSS segment, then the physical node that leaves the process is always the current node.

In FIG. 11, function f1 is a masked logical AND 77 with the logical address, with the mask coming from the SCT. Function f2 is a masked logical AND 79 to get the page offset, with the mask coming from the SCT. Function f3 is a logical right shift 81 of the logical address by the number of bits in a page, with the shift count from the SCT. Function f4 adds 83 a subspace set node number to get the 0'th node for the set, followed by a mask to perform a modulo operation 85, with the set node number and mask coming from the SCT. Function f5 adds 87 a node number to the above and then compares the result to a set of nodes that should be replaced, with the node number coming from the SCT. If there are any matches, the replacement node number is used. Also at this step, if this is a CSS subspace, the resulting node number is always replaced by the current node number. Function f6 right-shifts 89 the relative address by the number of bits in the page and the node fields, and then left shifts 91 by just the page size, with the shift counts coming from the SCT. There is no f7 needed. Function f8 then concatenates the page number with the page offset and adds 93 on a base value, with the base value coming from the SCT.

Neither any error checking nor the f9 logic is included in FIG. 11. The error checking logic may start with a comparison of the subspace index with some maximum, especially useful if the number of subspaces implemented is not a power of two. It may also include a comparison of the relative node number with some maximum (for those cases where the number of nodes is not a power of two), a comparison of the relative page number with some maximum, and/or a comparison of the local page number with some maximum. Again, the comparison information comes from the SCT.

An acceptable implementation may have the source node perform just the computations to the left of the SCT table illustrated in FIG. 11, leaving up to all of the computations on the right of the SCT table to be performed by the target node. As a safety check, the target node may want to duplicate the computations on the left of the SCT table to validate that the address is in fact destined for it.

The bits that make up the fields in each entry in an SCT table are listed in FIG. 12, with an assumption of a 64 bit logical address. Values here are the maximum, and may be less if implementation constraints are imposed.

The function labeled "Match and Replace" 95 may be implemented in a variety of fashions, from an associative memory in a TLB-like implementation, or an inverted hash table. Additional bits consisting of "node number/replacement node number" pairs would be needed in any case, with a maximum of about 128 bits per pair. The number of such pairs is implementation-dependent, but it is far less than using a table of physical node numbers to remap as necessary. If used for faulty node replacement, they may also be in common to all subspaces.

The bits for access rights checks depend on other factors such as the number of possible application classes and/or applications that may be running concurrently. As an example, if there are 4 application classes and 16 possible applications concurrently using the system for each class, then a bit vector of 64 bits provides a "yes/no" for each combination. One of these 64 bit values for each class of access rights would be needed in each SCT entry, and may in fact have different values for different nodes, depending on application needs.

Figure 13:
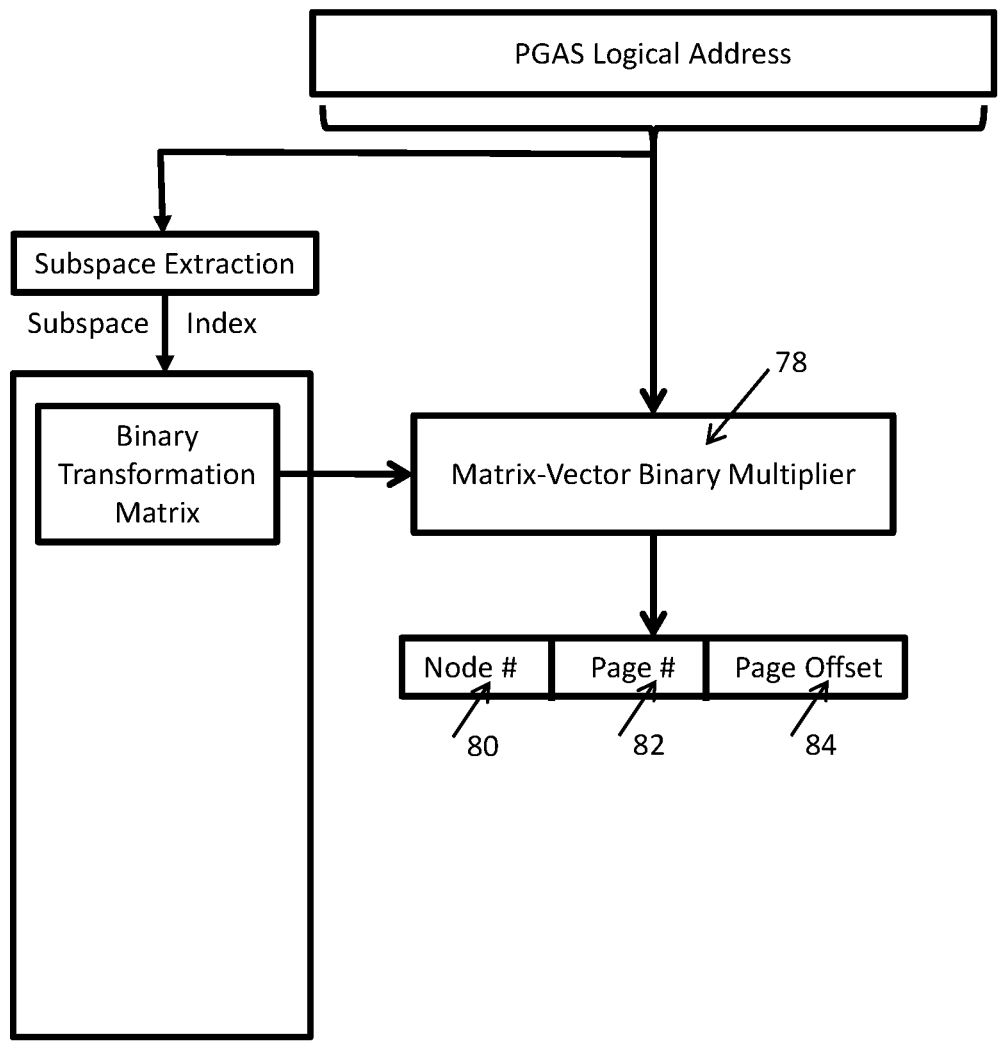
FIG. 13 illustrates a schematic diagram of an optional front end of the translation process using a binary matrix multiply.

FIG. 13 illustrates an alternative for the translation process using the binary matrix multiply technique. For each subspace, some or all of the address may be multiplied by a binary matrix 78 stored in the SCT entry for that subspace, with the product deriving a node number 80 and/or a page number 82 and/or a page offset 84. These numbers may be considered the relative, intermediate, local or even final values. If not the final values, then some subset of the functions in FIG. 11 may be employed.

A binary matrix that may collectively generate node, page numbers, and page offsets up to 64 bit each would require a matrix of 64 columns by 3*64 rows, for a maximum of 16 k bits per SCT entry. A completely flexible implementation may then combine both these and the fields of FIG. 12, along with a set of function selector fields that determine which functions to use at each step.

What is key here is the scalability—the same small number of bits are needed in each SCT at each node, regardless of the number of the nodes in the system, even if that number goes into the thousands.

Implementation of CLA-like functions may assume that any CSS subspace is paired with a non-CSS subspace which differs from the CSS subspace in one bit in the index, but has identical configuration parameters. Finding an address to a CSS subspace that is useable elsewhere starts with inverting the bit in the subspace index, then right shifting the logical address PageSize bits, but saving the page offset bits, masking out the node bits using the NodeSetSize mask, adding in the relative node number given to the current node for this subspace, and then shifting the whole address left by PageSize bits.

Figure 14:
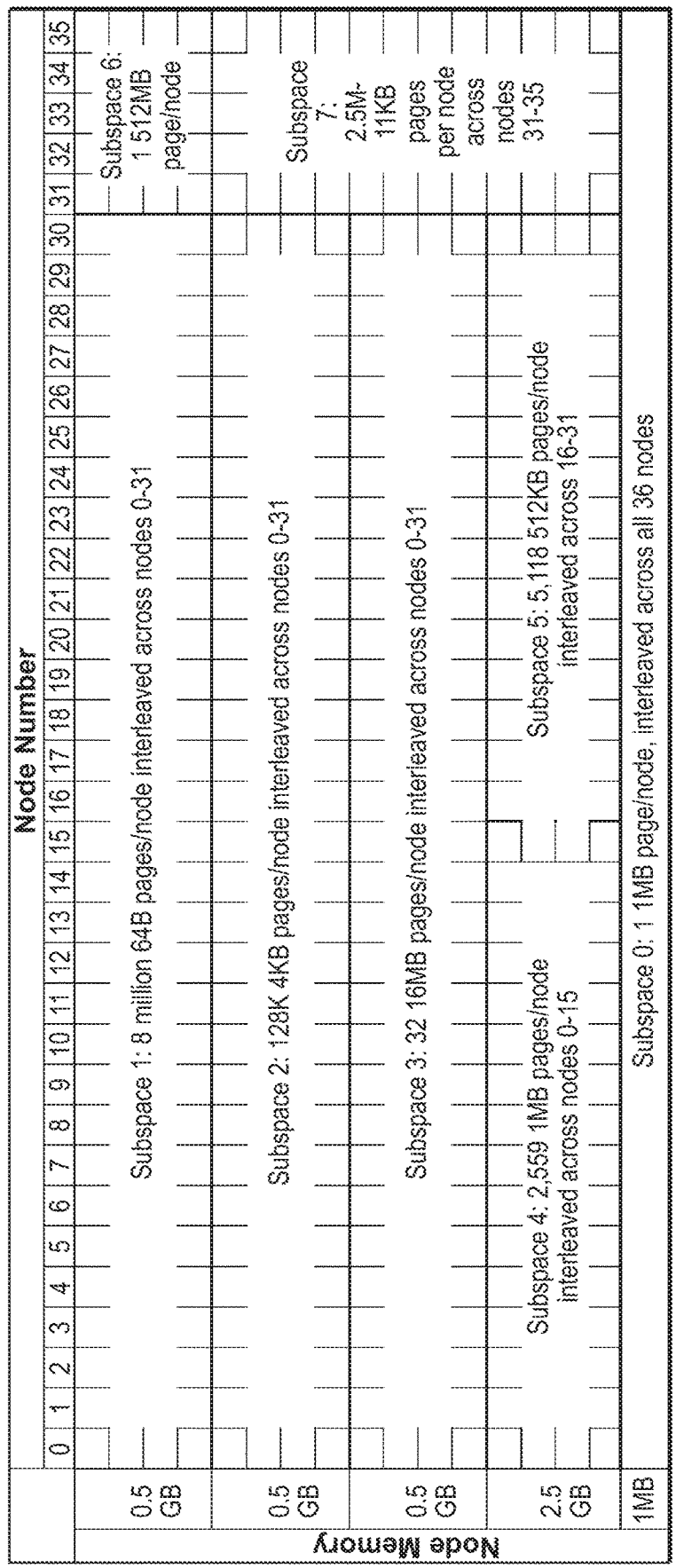
FIG. 14 illustrates a schematic diagram a sample map of a subspace configuration.

FIG. 14 illustrates a sample set of 8 subspaces and how that may map out over a set of 36 nodes. In this example, each node has 4 GB of memory allocated to the logical address space.

While this invention has been particularly shown and described with references to preferred embodiments thereof, it will be understood by those skilled in the art that various changes in Corm and details may be made therein without departing from the spirit and scope of the invention as defined by the appended claims.

What is claimed is:

1. A system to identify from an address an appropriate target node and a location in that node that holds desired data related to that address, comprising:
a logical address generator that generates a logical address associated with a logical address space, wherein said logical address is mapped, in a uniform partitioned global address space (PGAS) by application programs, into physical memory locations in a multi-node parallel computer said logical address space is application independent and based on the property of each node;

a subspace configuration table that receives a logical address and uses the logical address to retrieve a subspace index associated with one of a plurality of subspaces to locate desired data, wherein each subspace is a set of a plurality of predefined addresses in the logical address space that does not overlap with another subspace, the subspace index provides access to configuration information associated with one of said subspaces that is used to access a lookup table that holds a description of translation functions needed for mapping between the logical address to a physical address of a memory element having different memory representations of an address space as well as to allow parts of the address space to be sharable amongst several programs at the same time, wherein different parts of the logical address are configured to have different properties and access rights depending on a physical target node, the subspace configuration table also uses the logical address to retrieve a physical node number associated with a memory partition, a node address associated with a processor in the multi-node parallel computer, and the access rights.

2. The system of claim 1, wherein said subspace configuration table comprises information to control a plurality of functions, said functions comprise a plurality of implementations.

3. The system of claim 2, wherein outputs of said functions are selectively routed to inputs of other said functions.

4. The system of claim 3, wherein a set of said functions collectively convert an address presented to them on a first node to an address into a memory on a second node.

5. The system of claim 4, wherein said set of functions are split such that a first portion of said set of functions are performed on a source node, and a second portion of said set of functions are performed on a target node.

6. The system of claim 1, wherein said subspace identifies a subset of all addresses from a logical address space that are mapped into a specific subset of node and local memory addresses.

7. The system of claim 1, wherein said subspace configuration table is loaded into the target node when said system is booted or reconfigured, and is independent of programs running in the memory.

8. The system of claim 1, wherein said system permits identification of one or more common support subspaces as mapping to specific areas of local memory of the target node.

9. The system of claim 1, wherein said system employs both error checking and access rights checking as a function of the subspace, independent of an application making a request.

10. The system of claim 9, further comprising an application identification number that is appended to each request that indexes into information associated with each subspace allowing acceptable rights for an application in that subspace.

11. The system of claim 1, further comprising a special marking module that designates a subspace as a common support subspace, where all addresses are treated as offsets into a local memory region dedicated to the subspace on a current node.

12. The system of claim 1, further comprising a local address instruction module that produces a valid logical address which accesses relative location on a current node when passed through standard address translation.

13. A method for identifying from an address an appropriate target node and a location in that node that holds desired data related to that address, comprising the steps of:

generating a logical address using a logical address generator associated with a logical address space, wherein said logical address is mapped, in a uniform partitioned global address space (PGAS) by application programs, into physical memory locations distributed across a multi-node parallel computer said logical address space is application independent and based on the property of each node; and receiving the logical address and using the logical address to retrieve a subspace index associated with one of a plurality of subspaces using a subspace configuration table to locate said desired data, each subspace is a set of a plurality of predefined addresses in the logical address space that does not overlap with another subspace, the subspace index provides access to configuration information associated with one of said subspaces that is used to access a lookup table that holds a description of translation functions needed for mapping between the logical address to a physical address of a memory element having different memory representations of an address space as well as to allow parts of the address space to be sharable amongst several programs at the same time, wherein different parts of the logical address are configured to have different properties and access rights depending on a physical target node, the subspace configuration table also uses the logical address to retrieve a physical node number associated with a memory partition, a node address associated with a processor in the multi-node parallel computer, and the access rights.

14. The method of claim 13, wherein said subspace configuration table comprises information to control a plurality of functions, said functions comprise a plurality of implementations.

15. The method of claim 14, wherein outputs of said functions are selectively routed to inputs of other said functions.

16. The method of claim 14, wherein a set of said functions collectively convert an address presented to them on a first node to an address into a memory on a second node.

17. The method of claim 16, wherein said set of functions are split such that a first portion of said set of functions are performed on a source node, and a second portion of said set of functions are performed on a target node.

18. The method of claim 13, wherein said subspace index identifies a subset of all addresses from a logical address space that are mapped into a specific subset of node and local memory addresses.

19. The method of claim 13, wherein said subspace configuration table is loaded into the target node, and is independent of programs that run in the memory.

20. The method of claim 13, further comprising the step of permitting identifying one or more common support subspaces as mapping to specific areas of local memory of the target node.

21. The method of claim 13, further comprising the step of employing error checking and access rights checking as a function of the subspace, independent of an application making a request.

22. The method of claim 21, further comprising the step of appending an application identification number to each request that indexes into information associated with each subspace allowing acceptable rights for an application in that subspace.

23. The method of claim 13, further comprising the step of marking a subspace as a common support subspace using a special marking module, where all addresses are treated as offsets into a local memory region dedicated to the subspace on a current node.

24. The method of claim 13, further comprising the step of providing a compute local address instruction for producing a valid logical address which accesses relative location on a current node when passed through standard address translation.

25. A system to identify from an address an appropriate target node from a plurality of nodes and a location in that node that holds desired data, comprising:
a plurality of nodes, each node comprising:
a memory that stores the desired data;
a logical address generator that generates a logical address associated with a logical address space, wherein said logical address is mapped, in a uniform partitioned global address space (PGAS) by application programs, into physical memory locations in a multi-node parallel computer said logical address space is application independent and based on the property of each node;
a subspace configuration table that receives a logical address and uses the logical address to retrieve a subspace index associated with one of a plurality of subspaces to locate desired data, wherein each subspace is a set of a plurality predefined addresses in the logical address space that does not overlap with another subspace, the subspace index provides access to configuration information associated with one of said subspaces that is used to access a lookup table that holds a description of translation functions needed for mapping between the logical address to a physical address of a memory element having different memory representations of an address space as well as to allow parts of the address space to be sharable amongst several programs at the same time, wherein different parts of the logical address are configured to have different properties and access rights depending on a physical target node, the subspace configuration table also uses the logical address to retrieve a physical node number associated with a memory partition, a node address associated with a processor in the multi-node parallel computer, and the access rights.

26. The system of claim 25, wherein said system provides a range of protection options for accesses to different regions of the memory.

27. The system of claim 26, wherein said system allows for mapping between logical to physical addresses for different parts of an address space such that regions of memory are mapped in ways that are optimal for different types of data structures.

28. The system of claim 27, wherein parts of said predefined address space have local copies of data at each node.

29. A method for identifying from an address an appropriate target node from a plurality of nodes and a location in that node that holds desired data, comprising the steps:
providing a plurality of nodes, each node comprising:
a memory for storing the desired data;
generating a logical address using a logical address generator associated with a logical address space, wherein said logical address is mapped, in a uniform partitioned global address space (PGAS) by application programs, into physical memory locations in a multi-node parallel computer said logical address space is application independent and based on the property of each node; and
receiving the logical address and using the logical address to retrieve a subspace index associated with one of a plurality of subspaces using a subspace configuration table to locate said desired data in said memory of said node, wherein each subspace is a set of a plurality of predefined addresses in the logical address space that does not overlap with another subspace, the subspace index provides access to configuration information associated with one of said subspaces that is used to access a lookup table that holds a description of translation functions needed for mapping between the logical address to a physical address of a memory element having different memory representations of an address space as well as to allow parts of the address space to be sharable amongst several programs at the same time, wherein different parts of the logical address are configured to have different properties and access rights depending on a physical target node, the subspace configuration table also uses the logical address to retrieve a physical node number associated with a memory partition, a node address associated with a processor in multi-node parallel computer, and the access rights.

30. The method of claim 29, further comprising providing a range of protection options for accesses to different regions of the memory.

31. The method of claim 29, further comprising mapping between logical to physical addresses for different parts of an address space such that regions of memory are mapped in ways that are optimal for different types of data structures.

32. The method of claim 31, wherein parts of said address space have local copies of data at each node.

* * * * *